United States Patent [19]
Daio et al.

[11] Patent Number: 6,042,625
[45] Date of Patent: Mar. 28, 2000

[54] METHOD OF FABRICATING BATTERIES HAVING SPIRALLY WOUND ELECTRODES

[75] Inventors: Fumio Daio, Kitakatsuragi-gun; Hiroaki Yoshino, Hirakata; Yoshimitsu Kaneda; Takayuki Tanahashi, both of Moriguchi; Toshiyuki Shimizu, Sakai; Takeshi Inui, Yao, all of Japan

[73] Assignee: Matsushita Electric Industrial Co., Ltd., Osaka-fu, Japan

[21] Appl. No.: 09/300,509

[22] Filed: Apr. 28, 1999

Related U.S. Application Data

[62] Division of application No. 08/925,538, Sep. 8, 1997, Pat. No. 5,912,091.

[30] Foreign Application Priority Data

Oct. 16, 1996 [JP] Japan ................................ 8-273589

[51] Int. Cl.$^7$ .................................................. H01M 2/14
[52] U.S. Cl. ........................... 29/623.1; 429/211; 429/94
[58] Field of Search ........................... 29/623.1; 429/211, 429/94

[56] References Cited

U.S. PATENT DOCUMENTS 5,654,114  8/1997  Kubota et al. ...................... 429/94 X

FOREIGN PATENT DOCUMENTS 5-17809  5/1993  Japan .

*Primary Examiner*—John S. Maples
*Attorney, Agent, or Firm*—Akin, Gump, Strauss, Hauer & Feld, L.L.P.

[57] ABSTRACT

In a battery comprising a spirally wound electrode group, a lead plate drawn from one electrode of the electrode group and connected to the inner bottom surface of the battery case in electrically conducting relationship, and an insulating plate interposed between the lead plate and the electrode group, at least the bottom surface of the insulating plate is formed from a heat weldable material, and the lead plate is heat-welded to this heat weldable material. This construction not only serves to completely prevent accidental short-circuiting, but enables high-speed assembling of batteries.

3 Claims, 2 Drawing Sheets

METHOD OF FABRICATING BATTERIES HAVING SPIRALLY WOUND ELECTRODES

CROSS-REFERENCE TO RELATED APPLICATIONS

This application is a division of application Ser. No. 08/925,538, filed Sep. 8, 1997, now U.S. Pat. No. 5,912,091.

BACKGROUND OF THE INVENTION

The present invention relates to a cylindrical battery having a spirally wound electrode group formed by spirally winding a positive electrode plate, a negative electrode plate, and a separator interposed between the two electrodes, and more particularly to an improvement in the connecting portion between an electrode lead of the electrode group and a bottom surface of a battery case.

Alkaline storage batteries, such as nickel-cadmium storage batteries and nickel-metal hydride storage batteries, and primary and secondary lithium batteries are typical examples of the cylindrical battery having an electrode group formed by spirally winding a positive electrode plate, a negative electrode plate, and a separator interposed between the two electrodes. In this type of cylindrical battery, the cylindrical metallic battery case housing the electrode group also serves as the terminal of one electrode, and the lead plate of the one electrode in the electrode group, for example, the negative electrode, is connected to the inner bottom surface of the battery case.

In cylindrical batteries having such construction, there is a possibility that an end of the other electrode in the electrode group, for example, the positive electrode, may touch the inner bottom surface of the battery case or the lead plate connected thereto, causing internal short-circuiting.

To address this problem, the prior art discloses a construction aimed at preventing internal short-circuiting by providing an annular insulating plate between the bottom of the electrode group and the lead plate drawn from the electrode group.

In this construction, however, the insulating plate is only inserted between the electrode group and the bent lead plate. As a result, a situation can occur where the insulating plate will be displaced, for example, during insertion of the electrode group with the insulating plate assembled thereon into the battery case. This gives rise to the danger of internal short-circuiting, defeating its intended purpose of insulation.

Furthermore, since no means are provided for positioning the insulating plate in place, the prior art construction involves a possibility that if the center hole of the insulating plate is not positioned above the upper portion of the lead plate, a difficulty may arise when connecting the lead plate to the inner bottom surface of the battery by, for example, resistance welding or the like.

BRIEF SUMMARY OF THE INVENTION

The present invention is intended to overcome the above problems. The object of the present invention is to provide a battery having spirally wound electrodes free from defects such as short-circuiting and high in productivity. This can be achieved by eliminating the possibility that the insulating plate, inserted between the electrode group and the lead plate of one electrode drawn from the electrode group, is displaced or detached during assembly of the battery, and by completely preventing the lead plate and the battery case bottom surface connected to it from touching the other electrode.

The present invention provides a battery having spirally wound electrodes, comprising:
  an electrode group formed by spirally winding a positive electrode plate, a negative electrode plate, and a separator interposed between both electrodes;
  a battery case for housing the electrode group;
  a lead plate drawn from one electrode in the electrode group and connected to an inner bottom surface of the battery case in electrically conducting relationship; and
  an insulating plate interposed between the lead plate and the electrode group,
  wherein at least a bottom surface of the insulating plate is formed from a heat weldable material, and the lead plate is heat-welded to the heat weldable material.

In the battery of the present invention, since the lead plate drawn from the electrode group and the insulating plate interposed between the lead plate and the bottom of the electrode group are integrated by heat welding, the insulating plate is prevented from being displaced at the time of bending the lead plate and inserting the electrode group into the battery case; this not only ensures stable electrical conduction between the lead plate and the inner bottom surface of the battery case, but also serves to completely prevent the contact of the lead plate and the inner bottom surface of the battery case electrically connected to it with the other electrode.

The insulating plate, at least one surface of which faces the inner bottom surface of the battery case, should be formed from a heat weldable material. A preferred heat weldable material is a hot melt resin or a heat sensitive adhesive. Typical hot melt resins include ethylene-vinyl acetate copolymer, ethylene-ethyl acrylate copolymer, low-density polyethylene and the like. A polyolefin-based hot melt material endowed with heat weldability by treating a polyolefin such as polyethylene, polypropylene, etc. with maleic anhydride is more preferable.

Preferably, the electrical conduction between the lead plate and the inner bottom surface of the battery case is accomplished by heat welding the lead plate to the inner bottom surface of the battery case. In this case, the insulating plate is formed in a disk shape of a size substantially covering the inner bottom surface of the battery case, and a hole for inserting a welding electrode therethrough is formed in the center thereof.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention will now be described in more detail, with reference to the following specific, non-limiting examples.

Embodiment 1

Figure 1:
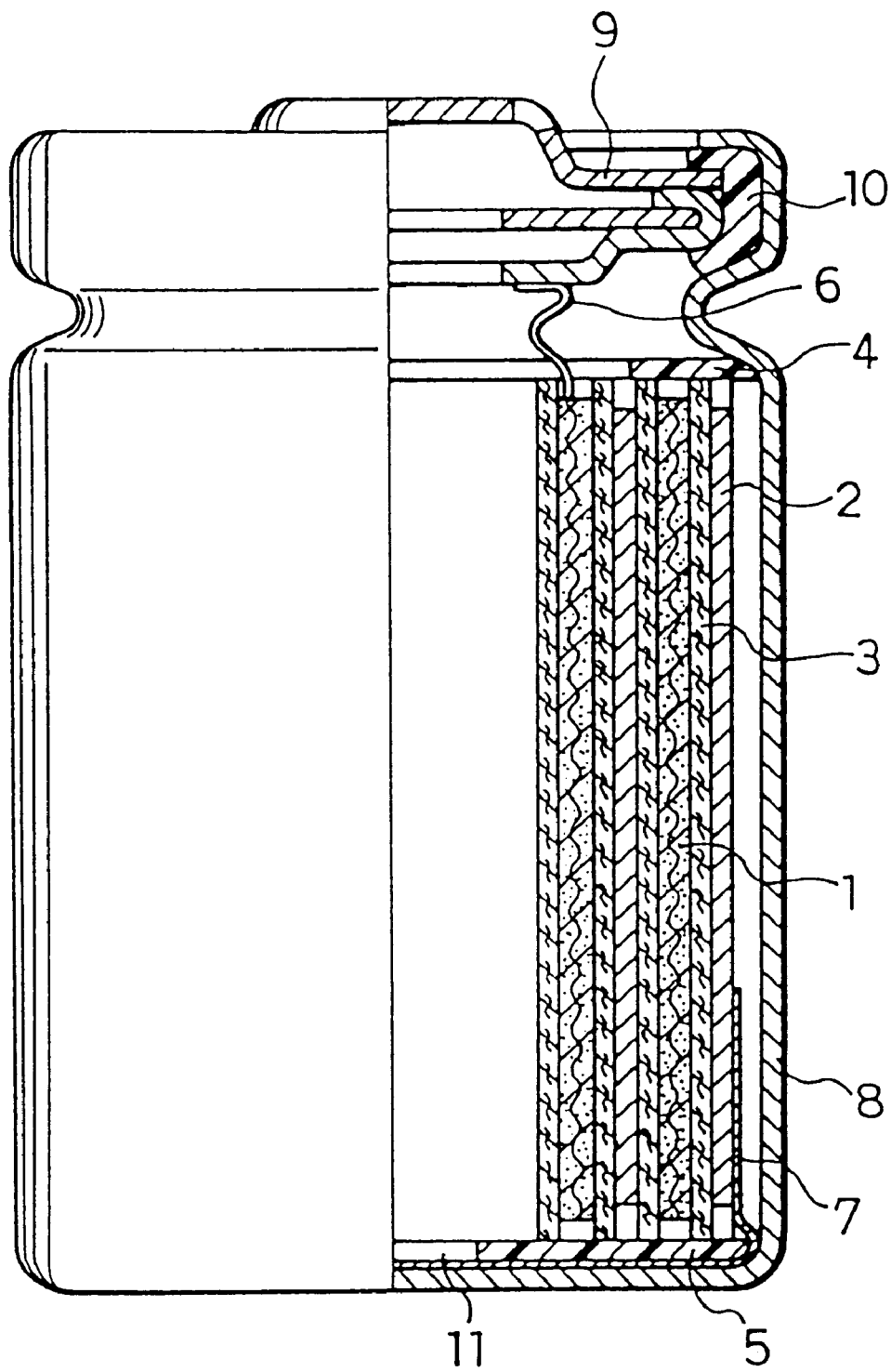
FIG. 1 is a front view, partly in cross section, of a battery according to one embodiment of the present invention.

FIG. 1 shows a battery according to one embodiment of the present invention. This battery is a cylindrical lithium primary battery using manganese dioxide as the primary active material for the positive electrode and lithium as the negative electrode.

A strip of positive electrode plate 1 with an electrode substrate as a current collector filled with an active material mixture composed primarily of manganese dioxide, a strip of negative electrode plate 2 formed from a lithium metal, and a separator 3 interposed therebetween are wound spirally to form a spirally would electrode group. The electrode group is placed inside a metallic battery case 8 which also serves as the negative electrode terminal. A sealing plate assembly 9 with a safety valve is fitted in the upper opening of the battery case 8 with a grommet 10 interposed therebetween. The top portion of the sealing plate assembly 9 acts as the positive electrode terminal. A positive electrode lead plate 6 connected to the substrate of the positive electrode plate is attached to the sealing plate assembly 9. An upper insulating plate 4 is placed on the upper portion of the electrode group.

Figure 2:
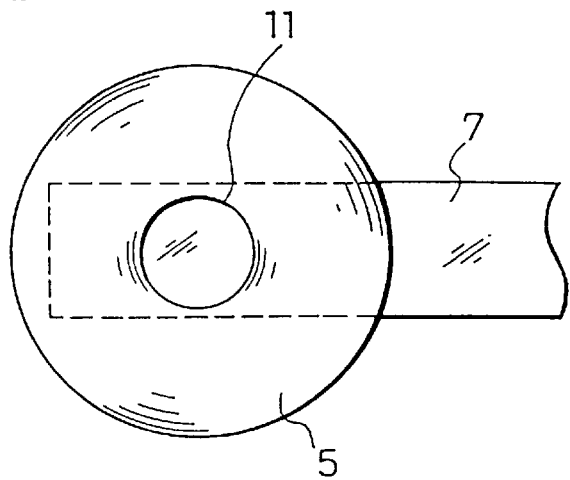
FIG. 2 is a plan view showing portions of a lower insulating plate and negative electrode lead plate of the same battery.
Figure 3:
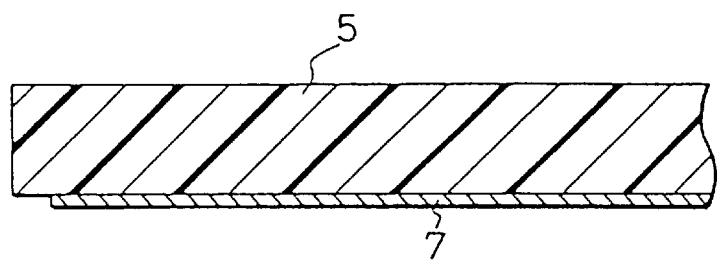
FIG. 3 is a cross-sectional view showing essential portions of the lower insulating plate and negative electrode lead plate of the same battery.
Figure 4:
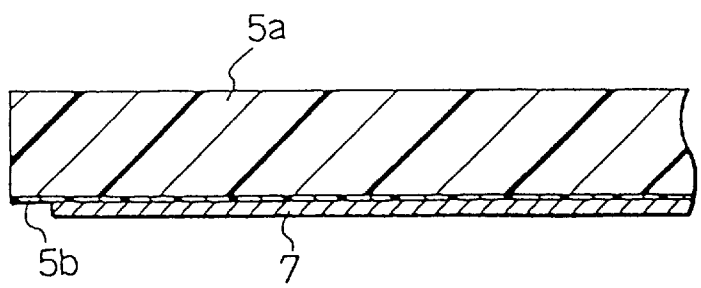
FIG. 4 is a cross-sectional view showing essential portions of the lower insulating plate and negative electrode lead plate in another embodiment.

An annular lower insulating plate 5, formed from heat weldable polypropylene whose surface has been treated with maleic anhydride, is heat-welded to a lead plate 7 drawn from the substrate of the negative electrode plate 2, as shown in FIGS. 2 and 3. The electrode group with the lower insulating plate 5 attached to the lead plate 7 in this way and with the lead plate 7 bent substantially at the right angle to hold the lower insulating plate 5 on the bottom of the electrode group is inserted into the battery case 8. Next, the lead plate 7 is welded to the inner bottom surface of the battery case 8 by using a welding electrode inserted through a space in the center of the electrode group and through a center hole 11 of the insulating plate 5.

After assembling the electrode group into the battery case as described above, a step portion was formed in the upper portion of the battery case, and an organic electrolyte, consisting of a solvent mixture of propylene carbonate and 1,2-dimethoxyethane and lithium trifluoromethanesulphonate ($CF_3SO_3Li$) dissolved in the solvent at 0.5 mol/l, was injected. Then, the grommet 10 and the sealing plate assembly 9 were fitted in the opening of the battery case to complete the fabrication of a hermetically sealed battery. In this way, a cylindrical manganese dioxide-lithium primary battery with an outer diameter of 17 mm, a height of 35 mm, and a cell capacity of 1300 mAh was fabricated.

Embodiment 2

A cylindrical manganese dioxide primary battery was fabricated in the same manner as in the first embodiment, except that the insulating plate was composed of a lower insulating plate 5a not formed from the heat weldable polypropylene whose surface had been treated with maleic anhydride, as used in the first embodiment, and a layer 5b formed from the above-mentioned heat weldable polypropylene in contact with the negative electrode lead plate 7. The layer 5b was then heat-welded to the negative electrode lead plate 7.

Comparative Example

A cylindrical manganese dioxide primary battery was fabricated in the same manner as in the first embodiment, except that the lower insulating plate was not formed from a heat weldable material but was only inserted between the electrode group and the lead plate 7.

Table 1 shows the details of process-associated defects when each 100,000 units of the batteries of the first embodiment, the second embodiment, and the comparative example were fabricated on a production line with a production capacity of 140 units/minute.

TABLE 1

| | Number of defects | | |
|---|---|---|---|
| Process-associated defects | Embodiment 1 | Embodiment 2 | Comparative example |
| Detached lower insulating plate | 0 | 0 | 26 |
| Internal short-circuiting caused by detached lower insulating plate | 0 | 0 | 5 |
| Welding failure of negative electrode lead due to displacement of lower insulating plate center hole | 0 | 0 | 88 |

As can be seen from Table 1, the batteries of the present invention are free from such defects as detachment of the lower insulating plate, so that internal short-circuiting between the positive electrode and the negative electrode lead plate or battery case is completely prevented.

In the battery of the comparative example, when the processes of bending of the negative electrode lead, insertion of the lower insulating plate, etc. were carried out at high speed, process-associated defects, such as incomplete bending of the negative electrode lead plate and detachment of the lower insulating plate, were found to increase in number, imposing a limit in increasing the production line speed.

On the other hand, in the batteries of the present invention, since the lower insulating plate and negative electrode lead plate are fixed together, detachment of the insulating plate does not occur, and even when the negative electrode lead plate is bent incompletely, internal short-circuiting is prevented, allowing a further increase in production line speed.

In the above embodiments, the lower insulating plate was made in an annular disk shape because of the need to join the negative electrode lead to the inner bottom surface of the battery case by resistance welding, but when the negative electrode lead plate is not welded to the battery case, the insulating plate may be formed in a disk shape without a hole in the center thereof. The insulating plate may also be formed in a D shape (semilunar shape). Furthermore, the battery case is not limited to a cylindrical shape, and may be formed in a rectangular shape. In that case, the insulating plate may be formed in the shape of a square. In this way, the insulating plate is not limited to any particular shape.

As described above, according to the present invention, in a battery wherein an electrode group formed by spirally winding a positive electrode plate, a negative electrode plate and a separator interposed therebetween is placed inside a battery case which also serves as a terminal of one electrode, and a lead plate drawn from one electrode of the electrode group is connected to the inner bottom surface of the battery case in electrically conducting relationship, the insulating plate inserted between the lead plate and the electrode group is prevented from being displaced or detached at the time of assembling the battery, and the lead plate and the inner bottom surface of the battery case connected thereto are completely prevented from touching the other electrode.

Accordingly, the present invention can provide a battery having spirally wound electrodes free from defects such as internal short-circuiting and high in productivity.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method of fabricating a battery having spirally wound electrodes, said battery comprising an electrode group formed by spirally winding a positive electrode plate, a negative electrode plate, and a separator interposed between both electrodes, a battery case for housing said electrode group, a lead plate drawn from one electrode in said electrode group and connected in an electrically conducting relationship to an inner bottom surface of said battery case, and an insulating plate interposed between said lead plate and said electrode group, wherein at least a bottom surface of said insulating plate is formed from a heat weldable material; said method comprising the steps of:

heat welding the lead plate to the bottom surface of the insulating plate;

bending the lead plate, thereby holding the insulating plate on a bottom of the electrode group; and placing the electrode group into the battery case.

2. The method of fabricating a battery according to claim 1, wherein said insulating plate comprises an insulating resin plate and a hot melt adhesive layer coated on a lower surface of said insulating resin plate.

3. A method of fabricating a battery having spirally wound electrodes, said battery comprising an electrode group formed by spirally winding a positive electrode plate, a negative electrode plate, and a separator interposed between both electrodes, a battery case for housing the electrode group, a lead plate drawn from one electrode in the electrode group and connected in electrically conducting relationship to an inner bottom surface of the battery case, and an insulating plate interposed between the lead plate and the electrode group and at least one surface of which is formed from a heat weldable material, said method comprising the steps of:

heat welding the lead plate to the one surface of the insulating plate;

bending the lead plate, thereby holding the insulating plate on a bottom of the electrode group; and placing the electrode group into the battery case.

* * * * *